Figure 1:
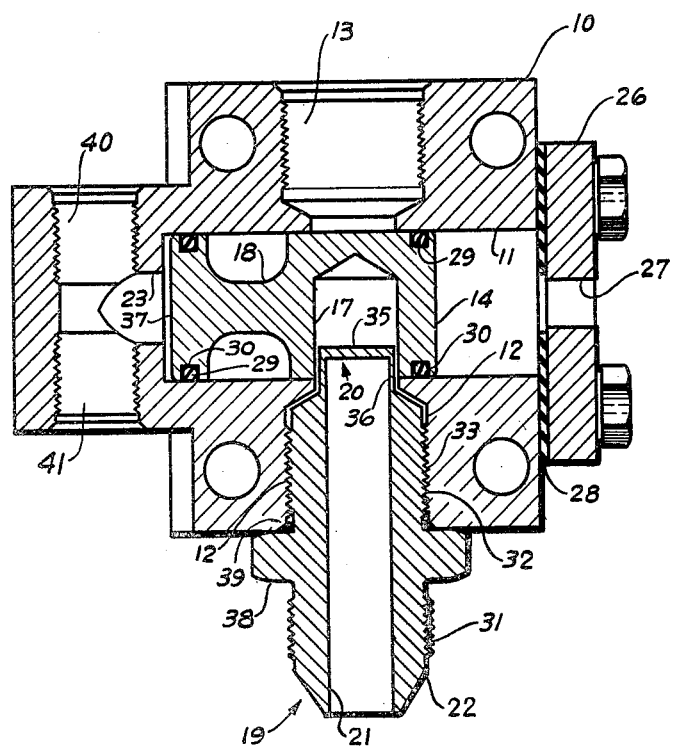

June 11, 1963  S. MERKOWITZ  3,093,151
SHEAR VALVE AND FRANGIBLE FITTING
Filed Sept. 12, 1958  2 Sheets-Sheet 1

INVENTOR.
SAMUEL MERKOWITZ.
BY
ATTORNEY.

June 11, 1963 S. MERKOWITZ 3,093,151
SHEAR VALVE AND FRANGIBLE FITTING
Filed Sept. 12, 1958 2 Sheets-Sheet 2
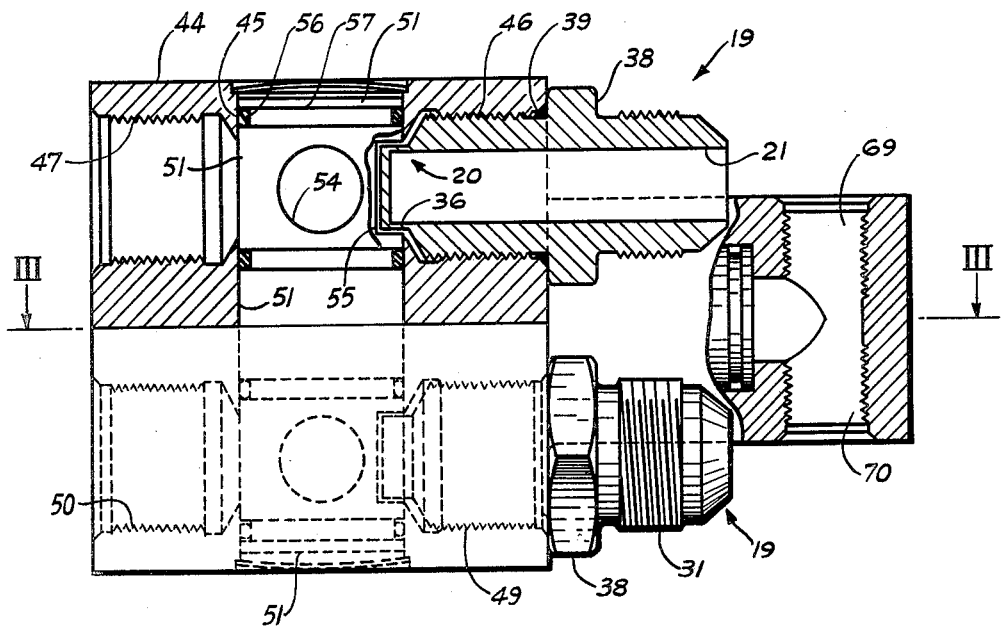
FIG_2
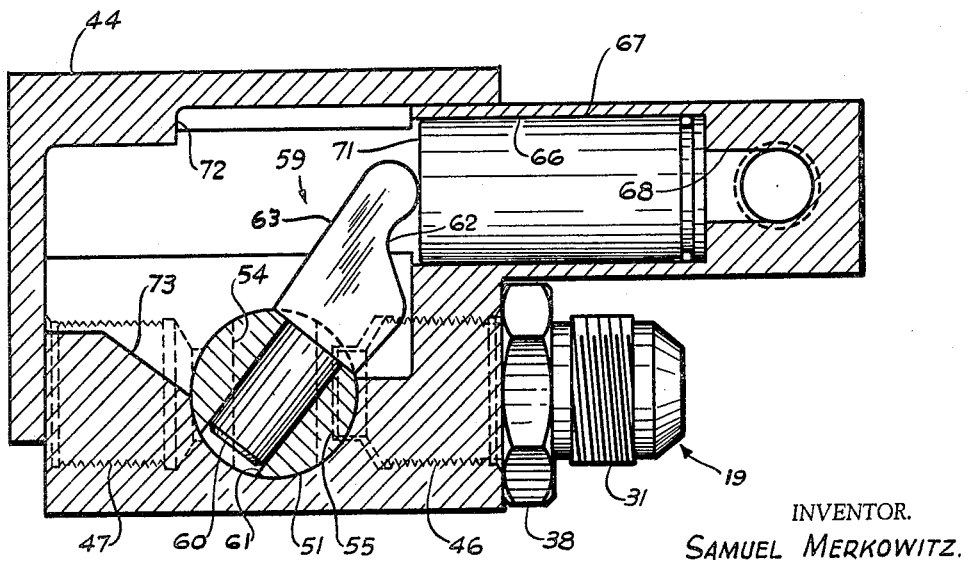
FIG_3
INVENTOR.
SAMUEL MERKOWITZ.
BY
*Walter J. Jason*
ATTORNEY.

United States Patent Office 3,093,151
Patented June 11, 1963

3,093,151
SHEAR VALVE AND FRANGIBLE FITTING
Samuel Merkowitz, San Diego, Calif., assignor to General Dynamics Corporation, San Diego, Calif., a corporation of Delaware
Filed Sept. 12, 1958, Ser. No. 760,722
11 Claims. (Cl. 137—68)

The present invention relates to a shear valve and frangible fitting, and more particularly relates to a valve which shears off the end of a closed fitting to permit fluid to flow therefrom.

Prior valves which perform similar functions are generally subject to some serious disadvantages. One of these disadvantages resides in the manner in which the closed fluid passageway is forced open to allow fluid to flow therefrom. Explosive or one shot type valves generally open the fluid passageway in such a manner that particles of metal or other debris remain in the fluid to cause malfunctions or breakdown of other equipment in the fluid circuit. The present invention, however, is not subject to this disadvantage for it includes means for removing such debris from the fluid passageway.

Another disadvantage of some prior valves is that they are designed so that the valve mechanism must act against the fluid system pressure in order to open the fluid passageway. In contrast, the present invention is designed so that it opens a fluid passageway without having to operate against fluid pressure.

Some prior valves are made so that seals such as O-rings must be used to maintain system pressure prior to the fluid passageway being opened. The instant invention, however, requires no such seals in order to maintain system pressure prior to the fluid passageway opening operation.

Generally, prior valves are "one-shot" valves. This means that they can be used only once and then must be replaced in their entirety. The present invention is not a one-shot device, however, for by merely replacing a fitting it is possible to use the present invention again and again.

It is therefore an object of the present invention to provide a shear valve and frangible fitting which will positively hold system pressure in a fluid passageway until the valve is actuated.

Another object is to provide a valve and fitting which do not leave debris in the fluid system as a result of the valve's opening operation.

Another object is to provide a valve which can be re-used by merely changing a fitting.

Other objects and features of the present invention will be readily apparent to those skilled in the art from the following specification and appended drawings wherein is illustrated a preferred form of the invention, and in which:

FIGURE 1 is a cross-sectional view showing the invention utilizing one type of spool or valve member that may be used to open the fluid passageway;

FIGURE 2 is a cross-sectional view showing the invention utilizing another type of valve member which may be used to open the fluid passageway; and FIGURE 3 is a view taken along line III—III of FIGURE 2. Referring now to the drawings, FIGURE 1 shows a valve housing 10 having a spool bore 11 disposed therein and an inlet port 12 and outlet port 13 intersecting spool bore 11. A spool 14 is positioned in bore 11 and it is longitudinally movable therein. A recess 17 and an annular groove 18 are located on spool 14. When spool 14 is in the position shown in FIGURE 1, which is its normal position, then spool recess 17 lies over inlet port 12. A fitting 19 is shown inserted in inlet port 12. Fitting 19 has a stepped end portion which protrudes into recess 17 of spool 14. Fitting 19 has a fluid passage or passageway 21 disposed therein. This passageway is open on the exterior end 22 of fitting 19 but it is closed on the other end by stepped end portion 20.

Housing 10 contains a pressure inlet 23 disposed at one end of spool bore 11. A plate 26 is attached to housing 10 to close the other end of spool bore 11. Plate 26 has a bleed hole 27 located therein and a gasket or seal 28 is positioned between plate 26 and valve housing 10 to provide a fluid tight seal. Fluid tight seals are also used on spool 14 and are shown as O-rings 29 fitted in O-ring grooves 30.

In operation, fitting 19 has its exterior end portion 22 connected to a fluid line by threads 31 or other suitable means. The fluid passageway 21 of fitting 19 thus becomes filled with fluid from the fluid line. Fitting 19 is held in inlet port 12 by threads 32 on fitting 19 and threads 33 disposed in inlet port 12. The stepped end portion 20 of fitting 19 is frangible and easily sheared off. This end portion is made frangible by providing the fitting with a thin wall 36 at the stepped end portion 20. End portion 20 also has an end wall 35 which is, preferably, a flat wall having a thickness greater than frangible wall 36. Such an end wall facilitates the shearing action that occurs in removing end portion 20 from fitting 19.

As long as the frangible end portion is attached to fitting 19, however, it provided a positive fluid seal without the need for any gaskets, O-rings or the like. When it is desired to open fluid passageway 21, pressure is applied to end 37 of spool 14. This pressure is applied through pressure inlet 23 and it may be provided by any suitable means. In response to this pressure, spool 14 moves to the right in spool bore 11, and in so doing, recess 17 shears off the frangible end portion 20 of fitting 19. Spool 14 then continues its motion until it is stopped by plate 26 at the end of the spool bore. The bleed hole 27 in plate 26 is utilized to give the proper dampening to the spool motion at the end of its stroke. When spool 14 reaches its new position adjacent plate 26, then the annular groove 18 in the spool provides a fluid passageway between inlet port 12 and outlet port 13. The cross-sectional area of annular groove 18 should be at least as large as one half the cross sectional area of the fluid passageway 21 in fitting 19. This will minimize the pressure loss experienced by fluid as it flows through the valve.

Perhaps more important than this, however, is the fact that when spool recess 17 shears off the stepped end portion 20 of fitting 19 it carries this end portion away from the fluid passageway and traps the sheared off portion or debris against the side of spool bore 11. As a result, the "opening" operation of the valves does not introduce any debris or other matter into the fluid passageway which might cause failure or malfunction of other equipment in the fluid circuit.

After the fluid passageway has been opened, the O-rings 29 and the spool provide a fluid tight seal so that fluid entering fitting 19 cannot escape from the valve except through the intended exit, outlet port 13. To insure that no leakage occurs between the threads 32 of fitting 19 and threads 33 of inlet port 12, a flange 38 is provided on the fitting and an O-ring 39 is seated thereagainst to form a fluid tight seal between fitting 19 and valve housing 10. This fluid tight seal is formed every time a new fitting is inserted in the valve housing in preparation for use of the device.

The versatility of the invention, as evidenced by its longevity, is even further enhanced by the fact that there are a variety of ways in which the required operating pressure can be provided. The valve housing 10, shown in FIGURE 1 includes line pressure inlets 40 and 41 to which fluid pressure lines can be connected. When desired, fluid pressure can be sent through these pressure inlets and subsequently through pressure inlet 23 to act on end 37 of the spool. Other means by which the necessary pressure can be provided include the gas squib and the explosive cartridge.

In addition to this variety of actuating means, an alternate spool or valve member arrangement can also be used. Then, too, a valve member and housing can be formed so that a plurality of fittings can be engaged therewith and opened thereby. FIGURE 2 shows an alternate valve member configuration adapted to be used with a plurality of fittings. A valve housing 44 is shown having a bore 45 disposed therein and an inlet port 46 and outlet port 47 intersecting bore 45. An additional inlet port 49 and outlet port 50 are shown intersecting bore 45 also. A valve member 51 is positioned in bore 45 and rotatable therein. Valve member 51 contains a passageway 54 and a recess 55. The valve member is movable so that in one position recess 55 can lie over inlet port 46 and in another position passageway 54 can connect inlet port 46 to outlet port 47. O-rings 56 are disposed in O-ring grooves 57 on the valve member to provide fluid tight seals. This arrangement of a passageway, recess, and O-rings is repeated on the valve member at a position corresponding to inlet port 49 and outlet port 50 of housing 44. It is understood that more inlet ports, outlet ports, and corresponding valve member extensions could be provided if desired.

Each inlet port in housing 44 is adapted to receive a fitting 19. This fitting is the same as that used with the arrangement shown in FIGURE 1. In operation, fitting 19 is attached to a fluid line and fluid fills passageway 21 of fitting 19. When it is desired to open this passageway valve member 51 is rotated, by suitable means, and recess 55 shears off the frangible stepped end portion 20 of fitting 19. Continued rotation of valve member 51 moves passageway 54 into a position where it connects inlet port 46 to outlet port 47. At the same time, recess 55 has removed the sheared off fitting end and trapped it against side of the bore 45. The opening operation described also takes place at inlet port 49 to connect outlet port 50 thereto. Except for this plural arrangement, however, the valve member 51 is very much like that illustrated in FIGURE 1. And, just as with the configuration of FIGURE 1, it is possible to use a variety of methods to produce the valve member actuation.

FIGURE 3, which is a view taken along line III—III of FIGURE 2, illustrates one mechanism that can be used in actuating valve member 51. A cam member 59 is shown which has a rod portion 60 inserted in a hole 61 of valve member 51. Cam member 59 has a cam surface 62 and a stop surface 63. Valve housing 44 has a piston cylinder 66 with a piston 67 disposed therein to be longitudinally movable against cam member 59. A pressure inlet 68 admits pressure to piston cylinder 66 to provide energy for actuating piston 67. As with housing 10 shown in FIGURE 1, housing 44 has line pressure inlets 69 and 70. A source of fluid pressure can be connected to these line pressure inlets to provide the pressure for actuating piston 66 when desired. As previously indicated, however, a gas squib, explosive cartridge, or other means can be used to actuate the piston. When the piston is caused to move, piston end 71 contacts cam surface 62 of cam member 59. As cam member 59 is caused to move, valve member 51 is forced to rotate with it and recess 55 shears off the stepped frangible fitting end 20 of fitting 19. Piston 67 continues to move cam member 59 and rotate valve member 51 until it butts against stop edge 72 of housing 44. As piston 67 butts against stop edge 72, the stop surface 63 of cam member 59 comes to rest against surface 73 of housing 44. When cam member 59 is in this position the valve member passageway 54 is aligned so that it connects inlet port 46 to outlet port 47. Thus, cam member 59 and piston 67 provide a simple mechanism for actuating valve member 51. It is understood, however, that valve member 51 can be rotated by means other than that shown in FIGURE 3. And, while preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A valve and fitting, said valve comprising a housing, an elongated valve member movably positioned within a bore in said housing and having opposite ends and wall means intermediate said ends, said housing having inlet and outlet ports intersecting the valve bore, said valve member positioned within the valve bore to span across said intersecting inlet and outlet ports, a fitting mounted in said inlet port of said housing, and said fitting having a passageway therein, a frangible wall sealing said passageway, said frangible wall projecting into the valve bore of said housing, said valve member having a recess in said wall means receiving and completely encompassing said frangible wall of said fitting, said valve member having fluid passage means intermediate the ends thereof, actuating means adapted to impart motion to said valve member, and sealing means for sealing said actuating means from fluid within said valve housing whereby upon activation of said actuating means said frangible wall of said fitting is sheared off and said passage means registers with said inlet and outlet ports.

2. A valve and fitting, said valve comprising a housing, an elongated valve movably positioned within a bore in said housing and having opposite ends and wall means intermediate said ends, said housing having inlet and outlet ports intersecting the valve bore, said valve positioned within the valve bore to span across said intersecting inlet-outlet ports, a fitting mounted in said inlet port of said housing, said fitting having a passageway therein, a frangible wall sealing said passageway, said frangible wall projecting into the valve bore of said housing, said valve having a recess in said wall means receiving and completely encompassing said frangible wall of said fitting, said movable valve having fluid passage means intermediate the ends thereof, sealing means carried on said valve spaced outwardly from the intersection of said inlet-outlet ports, and actuating means adapted to impart motion to said valve upon activation thereof whereby said frangible wall of said fitting is sheared off and said passage means registers with said inlet and outlet ports.

3. A valve and fitting, said valve comprising a housing, a valve movably positioned within a bore in said housing, sealing means carried by said valve on opposite ends thereof, said valve having a recess and a fluid passage means positioned intermediate said sealing means, said housing having inlet and outlet ports intersecting the valve bore, said valve positioned within the valve bore to span across said intersecting inlet-outlet ports, a fitting mounted in said inlet port, said fitting having a passageway therein, a frangible wall sealing said passageway, said frangible wall projecting into the recess of said valve, and actuating means acting on said valve upon activation thereof whereby said frangible wall of said fitting is caused to be sheared off and said fluid passage means is caused to register with said inlet and outlet ports of said housing.

4. A valve and fittings, said valve comprising a housing, a valve movably positioned within a bore in said housing, a plurality of sealing means carried by said valve, said valve having a plurality of recesses and a plurality of fluid passage means positioned intermediate pairs of said sealing means, said housing having a plurality of inlet and outlet ports intersecting said valve bore, said valve positioned within the valve bore to span across each of said intersecting inlet-outlet ports, a fitting mounted in each of said inlet ports, said fittings having passageways therein, a plurality of frangible walls sealing said passageways respectively, said frangible walls projecting into the recesses of said valve, and actuating means acting on said valve to initiate movement thereof upon activation thereof whereby said frangible walls of said fittings are caused to be sheared off and retained in said recesses and said fluid passage means are caused to register with said inlet and outlet ports of said housing.

5. The valve and fittings of claim 4 wherein the actuating means comprises a cam member extending from said valve, and a piston engaging said cam member.

6. A valve and fitting, said valve comprising a housing, a valve movably positioned within a bore in said housing, said housing having inlet and outlet ports communicating with said valve bore, said valve positioned within said valve bore in spanning relationship with said inlet and outlet ports, sealing means carried by said valve on opposite ends thereof, said valve having a recess and a fluid passage means positioned intermediate said sealing means, a fitting mounted in said inlet port, said fitting having a passageway therein, a frangible wall on said fitting sealing said passageway, said frangible wall projecting into the recess of said valve, and actuating means adapted to initiate movement of said valve upon activation whereby said frangible wall of said fitting is caused to be sheared off and said fluid passage means is caused to register with said inlet and outlet ports of said housing.

7. A valve and fitting, said valve and fitting comprising a housing, a substantially cylindrical spool bore positioned in said housing, an inlet port and an outlet port intersecting said spool bore, a substantially cylindrical spool disposed in said spool bore and longitudinally movable therein, said spool having fluid seal means at each end thereof, said spool having a recess therein between said fluid seal means and a first spool position in which said recess lies over said inlet port, said spool having fluid passage means therein located between said fluid seal means and a second position in which said fluid passage means connects said inlet port to said outlet port, a fitting adapted for insertion in said inlet port, said fitting having a closed frangible end which protrudes into said recess when said spool is in said first position and said fitting is inserted in said inlet port, means attached to said housing for moving said spool, said spool recess surrounding said closed frangible fitting end and shearing off said closed frangible end as said spool is caused to move from said first to said second position, and said recess and said spool bore cooperating to enclose said sheared off frangible fitting end.

8. A valve and fitting, said valve and fitting comprising a housing, a substantially cylindrical spool bore positioned in said housing, said spool bore having a first end and a second end, an inlet port and an outlet port intersecting said spool bore between said ends, a substantially cylindrical spool disposed in said spool bore and longitudinally movable therein, said spool having O-ring seals and grooves thereon at each end thereof, actuating means at said first spool bore end for moving said spool, a bleed hole at said second spool bore end, a cylindrical recess in said spool between said O-rings, said recess lying over said inlet port when said spool is at said first spool bore end, an annular groove on said spool located between said O-rings, said annular groove providing a fluid passage between said inlet port and said outlet port when said spool is at said second spool bore end, a substantially cylindrical fitting adapted for insertion in said inlet port, said fitting having a closed frangible end which protrudes into said spool recess when said fitting is inserted in said inlet port, and said spool recess providing means for shearing off said frangible fitting end as said actuating means moves said spool from said first spool bore end to said second spool bore end.

9. A valve and fitting, said valve and fitting comprising a housing, a substantially cylindrical valve bore positioned in said housing, an inlet port and an outlet port intersecting said valve bore, a substantially cylindrical valve member disposed in said valve bore and rotatably movable therein, a recess in said valve member, a fluid passage means in said valve member, a first valve member position in which said recess lies over said inlet port, a second valve member position in which said fluid passage means connects said inlet port to said outlet port, a fitting adapted for insertion in said inlet port, a closed frangible end on said fitting protruding into said valve member recess when said valve member is in said first position and said fitting is inserted in said inlet port, actuating means connected for rotating said valve member from said first position to said second position, and said valve member recess providing means for shearing off said frangible fitting end as said valve member is so rotated.

10. A valve and fitting, said valve and fitting comprising a housing, a cylindrical bore positioned in said housing, an inlet port and an outlet port intersecting said bore, a cylindrical valve member disposed in said bore and rotatably movable therein, a plurality of fluid seal means on said valve member in spaced relationship, a recess in said valve member, a fluid passageway in said valve member, said recess and said fluid passageway positioned between spacially adjacent fluid seal means, a first valve member position in which said recess lies over said inlet port, a second valve member position in which said fluid passageway connects said inlet port to said outlet port, a fitting adapted for insertion in said inlet port, a closed frangible end on said fitting which protrudes into said valve member recess when said valve member is in said first position and said fitting is inserted in said inlet port, activating means connected to said valve member for imparting rotation thereto, and said valve member recess providing means for shearing off said frangible fitting end as said valve member is rotated from said first position to said second position.

11. A valve and fitting, said valve and fitting comprising a housing, a cylindrical valve bore in said housing, a substantially cylindrical valve member disposed in said valve bore and having a portion extending therefrom at one end of said bore, said valve member being rotatable in said bore and having at least two O-ring grooves and seals within said bore, a cylindrical inlet port and an outlet port intersecting said bore between said O-ring seals, a cylindrical recess in the side of said valve member, a fluid passageway in said valve member, said recess and said fluid passageway positioned between said O-ring seals, said valve member having a first position in which said recess lies over said inlet port and a second position in which said fluid passageway connects said inlet port to said outlet port, a substantially cylindrical fitting adapted for insertion in said inlet port, a closed frangible end on said fitting which protrudes into said valve member recess when said valve member is in said first position and said fitting is inserted in said inlet port, actuating means connected to the valve member portion extending from said bore, and valve member recess shearing off said frangible fitting end as said valve member is rotated from said first position to said second position by said actuating means.

References Cited in the file of this patent
UNITED STATES PATENTS

| | | |
|---|---|---|
| 1,854,477 | McKissick | Apr. 19, 1932 |
| 2,365,364 | Temple | Dec. 19, 1944 |
| 2,405,439 | Lubbock | Aug. 6, 1946 |
| 2,540,322 | Christensen | Feb. 6, 1951 |
| 2,777,455 | Daudelin | Jan. 15, 1957 |
| 2,796,074 | Daudelin | June 18, 1957 |
| 2,815,882 | Connell | Dec. 10, 1957 |